(12) United States Patent
Myers et al.

(10) Patent No.: US 6,693,924 B2
(45) Date of Patent: Feb. 17, 2004

(54) OPTICAL FIBER LASER STRUCTURE AND SYSTEM BASED ON ASE PUMPING OF CLADDING ELEMENT

(75) Inventors: John D. Myers, Hilton Head, SC (US); Michael J. Myers, Hilton Head, SC (US)

(73) Assignee: Kigre, Inc., Hilton Head, SC (US)

( * ) Notice: Subject to any disclaimer, the term of this patent is extended or adjusted under 35 U.S.C. 154(b) by 0 days.

(21) Appl. No.: 10/070,036

(22) PCT Filed: Jul. 31, 2001

(86) PCT No.: PCT/US01/24165
§ 371 (c)(1),
(2), (4) Date: Jun. 7, 2002

(87) PCT Pub. No.: WO02/11255
PCT Pub. Date: Feb. 7, 2002

(65) Prior Publication Data
US 2002/0172250 A1 Nov. 21, 2002

Related U.S. Application Data

(60) Provisional application No. 60/221,766, filed on Jul. 31, 2000.

(51) Int. Cl.$^7$ ................................................. H01S 3/30
(52) U.S. Cl. ............................... 372/6; 372/40; 372/41
(58) Field of Search .................................. 372/6, 40, 41, 372/25; 385/126

(56) References Cited

U.S. PATENT DOCUMENTS

| | | | |
|---|---|---|---|
| 5,283,232 A | * | 2/1994 | Kohno et al. ................ 505/431 |
| 5,485,480 A | * | 1/1996 | Kleinerman ..................... 372/6 |
| 5,530,709 A | * | 6/1996 | Waarts et al. .................... 372/6 |
| 5,530,710 A | * | 6/1996 | Grubb ............................. 372/6 |
| 5,677,920 A | * | 10/1997 | Waarts et al. .................... 372/6 |
| 5,696,782 A | * | 12/1997 | Harter et al. ................... 372/25 |
| 5,877,890 A | * | 3/1999 | Snitzer ...................... 359/337.5 |
| 5,912,910 A | * | 6/1999 | Sanders et al. ................ 372/22 |
| 5,930,030 A | * | 7/1999 | Scifres ...................... 359/341.3 |
| 5,933,271 A | * | 8/1999 | Waarts et al. ........... 359/341.31 |
| 5,946,093 A | * | 8/1999 | DeFreez et al. ............. 356/339 |
| 6,157,763 A | * | 12/2000 | Grubb et al. ................ 385/126 |
| 6,483,973 B1 | * | 11/2002 | Mazzarese et al. ......... 385/123 |

* cited by examiner

*Primary Examiner*—Paul Ip
*Assistant Examiner*—Tuan Nguyen
(74) *Attorney, Agent, or Firm*—Howard & Howard

(57) ABSTRACT

An optical fiber laser structure and system are disclosed. The fiber laser structure includes a core, an inner cladding, and an outer cladding. The core has a first and second end and includes a combination of ytterbium and erbium as a first active gain component. The inner cladding, having a length defined between the first and second ends, surrounds the core. The inner cladding includes neodymium as a second active gain component that is different from the first active gain component. The system includes a pumping source coupled to the inner cladding to provide energy to the neodymium in the inner cladding. Upon being pumped, the neodymium achieves amplified spontaneous emission in the inner cladding along the length between the first and second ends. As a result, energy is efficiently transferred from the neodymium to the combination of the ytterbium and erbium in the core thereby providing laser activity at an eye-safe laser wavelength of 1535 nanometers.

44 Claims, 1 Drawing Sheet

OPTICAL FIBER LASER STRUCTURE AND SYSTEM BASED ON ASE PUMPING OF CLADDING ELEMENT

This application claims the benefit of Provisional application No. 60/221,766 filed Jul. 31, 2000.

BACKGROUND OF THE INVENTION

1) Field of the Invention

The subject invention generally relates to an optical fiber laser structure and system. More specifically, the subject invention relates to an optical fiber laser structure and system including a core element and an ASE-pumped cladding element providing laser activity at a laser wavelength of from 1500 to 1600 nanometers.

2) Description of Related Art

Optical fiber laser structures and systems are known in the art. Cladding-pumped optical fiber laser structures and systems are also known in the art. Cladding-pumped optical fiber laser structures and systems are utilized throughout the medical and telecommunication industries. More specifically, cladding-pumped optical fiber laser structures and systems have advanced the state-of-the-art in these industries by permitting pumping of single-mode core elements with multi-mode high power pumping sources. As a result, optical fiber laser structures can be developed with power densities that are only limited by material considerations and the ability to introduce energy, through the pumping sources, into the optical fiber laser structure.

One example of a cladding-pumped optical fiber laser structure and system is disclosed in U.S. Pat. No. 5,291,501. Conventional cladding-pumped optical fiber laser structures, including the cladding-pumped structure disclosed in the above-referenced patent, are deficient for various reasons. For instance, the cladding-pumped structure disclosed in the '501 patent, and in particular the thulium-containing core element of this structure, only provides laser activity at a laser wavelength of 2 nanometers (nm). Therefore, the cladding-pumped structure disclosed in the '501 patent has limited application as it is not suitable for providing laser activity at a laser wavelength of from 1500 to 1600 nm. The laser wavelength of from 1500 to 1600 nm is critical in the medical industry for eye-safe optical fiber laser structures and is also critical in the telecommunication industry where this wavelength is the preferred operating wavelength.

The cladding-pumped optical fiber laser structures of the prior art are also deficient because these structures rely on lasing to transfer energy to the core element. Simply stated, reliance on lasing to transfer energy to the core element is not as efficient as utilizing amplified spontaneous emission to transfer the energy to the core element.

Due to the deficiencies identified in the cladding-pumped optical fiber laser structures of the prior art, including those set forth above, it is desirable to implement an optical fiber laser structure and system including a core element and an ASE-pumped cladding element providing laser activity at a laser wavelength of from 1500 to 1600 nanometers.

SUMMARY OF THE INVENTION AND ADVANTAGES

An optical fiber laser structure and system are disclosed. The optical fiber laser structure includes a core element and a cladding element. The core element has a first and second end. The core element includes a first active gain component. The cladding element at least partially surrounds the core element. The cladding element has a length defined between the first and second ends of the core element.

The cladding element includes a second active gain component that is different from the first active gain component. The second active gain component is suitable for achieving amplified spontaneous emission (ASE) in the cladding element. More specifically, the second active gain component is suitable for achieving ASE in the cladding element along the length between the first and second ends of the core element. As a result, energy is efficiently transferred to the first active gain component in the core element to provide laser activity at a laser wavelength of from 1500 to 1600 nanometers. The optical fiber laser system of the subject invention additionally includes a pumping source. The pumping source is coupled to the cladding element to provide the energy to the cladding element such that the second active gain component achieves the ASE.

Accordingly, the subject invention provides an optical fiber laser structure and system including a core element and an ASE-pumped cladding element that provides laser activity at a laser wavelength of from 1500 to 1600 nanometers.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
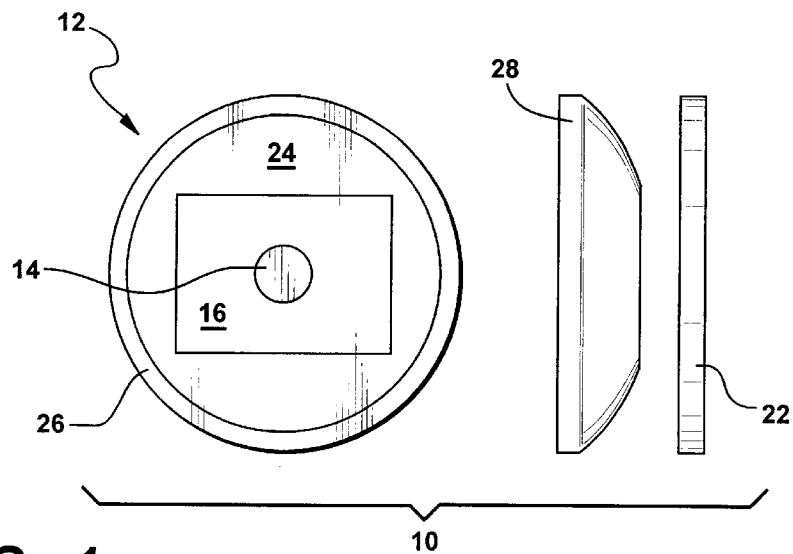
FIG. 1 is a cross-sectional view of an optical fiber laser system including an optical fiber laser structure in combination with a pumping source and an imaging device.

Referring to the Figures, wherein like numerals indicate like or corresponding parts throughout the several views, an optical fiber laser system is generally disclosed at 10. The optical fiber laser system includes an optical fiber laser structure that is generally disclosed at 12 throughout the Figures. It is to be understood that FIGS. 1 through 3, disclosing the optical fiber laser system 10 and the optical fiber laser structure 12 of the subject invention, are not necessarily to scale.

The optical fiber laser system 10, hereinafter referred to as "the system," and the optical fiber laser structure 12, hereinafter referred to as "the structure," according to the subject invention provide laser activity, or laser radiation, at a laser wavelength of from 1500 to 1600, preferably from 1530 to 1545, and most preferably at 1535, nanometers (nm). This laser wavelength is an eye-safe wavelength that can be utilized in an eye-safe laser. It is generally understood that eye-safe lasers (Class 1 Eye-Safe Lasers) are classified as lasers that cannot cause injury from viewing the accessible laser radiation for the maximum possible duration inherent in the design. The above classification is established by the Code of Federal Regulations, Part 21, Section 1040.10, entitled "Performance Standards for Light-Emitting Products." For descriptive purposes, the preferred eye-safe laser wavelength of from 1530 to 1545 nm is hereinafter referred to as "the preferred laser wavelength." At the preferred laser wavelength, the structure 12 and system 10 according to the subject invention are suitable for use in the medical industry, primarily in laser eye operation applications, and in the telecommunications industry where the preferred laser wavelength is an ideal operating wavelength.

The structure 12 includes a core element 14 and a cladding element 16. The cladding element 16, which is described in more detail below, is much larger than the core element 14. As disclosed in FIG. 2, the structure 12 preferably includes more than one core element 14 disposed side-by-side in the cladding element 16. Of course, it is to be understood that there can be more than two core elements 14. For instance, if there are three core elements 14, then the three core elements 14 would preferably be disposed in a triangular configuration in the cladding element 16. In addition to that which is described below, the core element 14 and the cladding element 16 preferably include phosphate-based glass. Alternatively, the core element 14 and the cladding element 16 may include silicate-based glass or tellurate-based glass. The core element 14 has a first 18 and second 20 end. As shown in the Figures, the first end 18 of the core element 14 is a left end, and the second end 20 of the core element 14 is a right end. Of course, it is to be understood that the core element 14 may be otherwise oriented.

The core element 14 includes a first active gain component. The first active gain component is also known in the art as a lasing ion or as a rare earth dopant. In preferred embodiments of the subject invention, the core element 14 is a single-mode core element 14, and the first active gain component of the core element 14 is further defined as a high threshold, three-level active gain component.

In one embodiment of the subject invention, the first active gain component of the core element 14 includes ytterbium (Yb) such that the laser activity is provided at the preferred laser wavelength. In a second embodiment of the subject invention, the first active gain component of the core element 14 includes erbium (Er) to provide the laser activity at the preferred laser wavelength. In a third embodiment of the subject invention, the first active gain component of the core element 14 is selected from the group consisting of Yb, Er, and combinations thereof to provide the laser activity at the preferred laser wavelength. Therefore, the first active gain component includes at least one of Yb or Er. In a fourth embodiment of the subject invention, the first active gain component of the core element 14 is selected from the group consisting of Ho, Pr, Dy, Sm, Eu, Tb, Ce, Cu, Cr, and combinations thereof. In a fifth embodiment of the subject invention, the most preferred embodiment, the first active gain component of the core element 14 includes a combination of Yb and Er to provide the laser activity at the preferred laser wavelength. In this most preferred embodiment, the weight ratio of Yb to Er in the combination ranges from 30.0:1 to 0.001:8.0. In all of these embodiments, the first active gain component is present is an amount from 0.001 to 10 parts by weight based on 100 parts by weight of the core element 14. It is to be understood that the amount, i.e., the concentration of, the first active gain component in the core element 14 as well as the dimensions of the core element 14 can be controlled such that a net gain is realized along the core element 14 with respect to a coupling efficiency of the structure 12.

The core element 14 may further include an additional active gain component. The additional active gain component of the core element 14, if included, is selected from the group consisting of Ho, Pr, Dy, Sm, Eu, Tb, Ce, Cu, Cr, and combinations thereof. In addition to the first active gain component and to the optional inclusion of the additional active gain component, the core element 14 may further include a sensitizer component. It is generally understood that a sensitizer component absorbs energy, or radiation, from a pumping source 22, which will be described below, and transfers the energy to first active gain component. If included, the sensitizer component is present in an amount from 0.001 to 30.0 parts by weight based on 100 parts by weight of the core element 14. In the most preferred embodiment of the subject invention, where the combination of Yb and Er provides the laser activity at the preferred laser wavelength, Yb functions as a sensitizer component for Er. However, in alternative embodiments, where Er is not present, Yb can suitably function as the first active gain component, i.e., as a lasing ion.

The cladding element 16 at least partially, and preferably completely, surrounds the core element 14. As described below, the cladding element 16 transfers energy from the pumping source 22 to the core element 14. The cladding element 16 has a length defined between the between the first and second ends 18, 20 of the core element 14. Furthermore, the cladding element 16 has a cross-sectional shape that is suitable for the efficient transfer of energy to the core element 14. It is to be understood that the shape, and even the size, of the cladding element 16 influences the energy that is received or absorbed by the core element 14. In the most preferred embodiment, the cross-sectional shape is further defined as a rectangular shape. However, it is to be understood that the subject invention is not limited to the rectangular shape and may include other cross-sectional shapes including, but not limited to, a round shape.

The cladding element 16 includes a second active gain component. The second active gain component is different from the first active gain component. The second active gain component is suitable for achieving amplified spontaneous emission (ASE) in the cladding element 16 along the length of the cladding element 16 between the first and second ends 18, 20 of the core element 14. As such, the energy from the pumping source 22 is efficiently transferred to the first active gain component in the core element 14 to provide the laser activity at the preferred laser wavelength. That is, the second active gain component in the cladding element 16 receives, or absorbs, the energy from the pumping source 22, as indicated by the arrows in FIG. 3, and efficiently transfers this energy to the core element 14 by ASE propagating along the length of the cladding element 16 between the first and second ends 18, 20 of the core element 14. ASE propagating along the length of the cladding element 16 results in the first active gain component being uniformly pumped by the ASE of the second active gain component in the cladding element 16. There is no requirement that the second active gain component in the cladding element 16 lase. Instead, the second active gain component relies on ASE.

The second active gain component includes Nd. Nd is suitable for achieving the ASE in the cladding element 16 to efficiently transfer energy to the first active gain component in the core element 14. In the most preferred embodiment, Nd is suitable for achieving the ASE in the cladding element 16 to efficiently transfer energy to at least one of Yb or Er or to the combination of Yb and Er in the core element 14. Alternatively, the second active gain component is selected from the group consisting of Ho, Pr, Dy, Sm, Eu, Tb, Ce, Cu, Cr, and combinations thereof, so long as the second active gain component is different from the first active gain component. In preferred embodiments of the subject invention, the second active gain component of the cladding element 16 is further defined as a low threshold, four-level active gain component. Therefore, the second active gain component has no absorption at its "lasing wavelength." In all of these embodiments, the second active gain component is present in an amount from 0.001 to 40.0 parts by weight based on 100 parts by weight of the cladding element 16. As with the core element 14, the cladding element 16 may further include an additional active gain component selected from the group consisting of Ho, Pr, Dy, Sm, Eu, Tb, Ce, Cu, Cr, and combinations thereof.

The cladding element 16 described above is further defined as an inner cladding element 16. More specifically, the inner cladding element 16 directly surrounds the core element 14, and the structure 12 further includes an outer cladding element 24 that surrounds the inner cladding element 16. Therefore, the terminology of the inner cladding element 16 will be utilized for the remaining description where appropriate. The structure 12 also preferably includes a protective coating 26 surrounding the outer cladding element 24. Suitable protective coatings 26 include, but are not limited to, silicone-based coatings, fluoropolymer-based coatings, or even low index glasses.

The core element 14, the inner cladding element 16, and the outer cladding element 24 each have an index of refraction, $n_1$, $n_2$, $n_3$, respectively. The index of refraction $n_1$ of the core element 14 is greater than the index of refraction $n_2$ of the inner cladding element 16. In preferred embodiments of the subject invention, the index of refraction $n_1$ of the core element 14 is greater than the index of refraction $n_2$ of the inner cladding element 16 by about 0.001. The difference in the index of refraction $n_1$ of the core element 14 to the index of refraction $n_2$ of the inner cladding element 16, as indicated above, determines a mode value of the core element 14. Also, the index of refraction $n_2$ of the inner cladding element 16 is greater than the index of refraction $n_3$ of the outer cladding element 24. In preferred embodiments of the subject invention, the index of refraction $n_2$ of the inner cladding element 16 is greater than the index of refraction $n_3$ of the outer cladding element 24 by about 0.01. The difference in the index of refraction $n_2$ of the inner cladding element 16 to the index of refraction $n_3$ of the outer cladding element 24, as indicated above, determines an angle at which energy can be pumped into the structure 12 by the pumping source 22. In sum, a relationship of the index of refraction $n_1$ of the core element 14 to the index of refraction $n_2$ of the inner cladding element 16 to the index of refraction $n_3$ of the outer cladding element 24 is $n_1 > n_2 > n_3$. The relationship set forth above, where the index of refraction decreases from the core element 14 outward to the outer cladding element 24 determines a numerical aperture or an angle at which energy emerges from the various elements of the structure 12.

In combination with the pumping source 22 set forth above, the optical fiber laser structure 12 establishes the optical fiber laser system 10 of the subject invention. More specifically, the pumping source 22 is coupled to the inner cladding element 16 to provide the energy, or radiation, to the inner cladding element 16 and, as described above, the second active gain component receives, or absorbs, this energy from the pumping source 22 to achieve the ASE. Many different pumping sources 22 are suitable for providing the energy to the inner cladding element 16. Suitable pumping sources 22 include, but are not limited to, laser diodes or diode arrays, flashlamps, thermal blackbodies, and nuclear radiation.

The overall advantage of the core element 14 and the inner cladding element 16 of the subject invention, as described above, is that the second active gain component in the inner cladding element 16, which is a low threshold, four-level active gain component, can be pumped by a low brightness pumping source 22. Furthermore, an emission wavelength of the second active gain component matches absorption bands of the first active gain component in the core element 14, which is a high threshold, three-level active gain component. Described in another manner, the energy from the pumping source 22, at a first wavelength, is absorbed by the second active gain component in the inner cladding element 16, then the second active gain component in the inner cladding element 16 undergoes ASE at a second wavelength, which is, in turn, absorbed by the first active gain component in the core element 14 to obtain significant inversion and provide gain, or the laser activity, at a third wavelength of from 1530 to 1545 nm.

Figure 2:
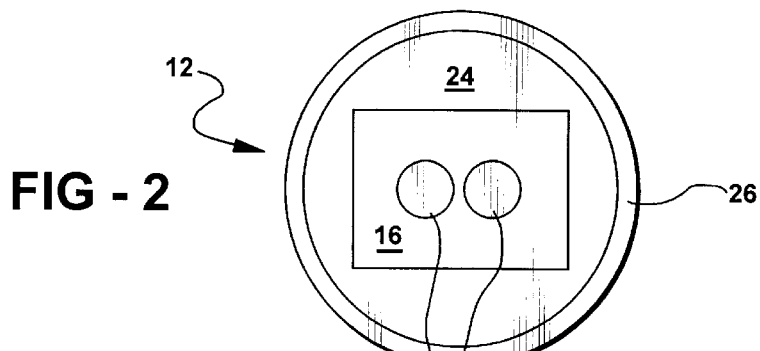
FIG. 2 is a cross-sectional view of the optical fiber laser structure including more than one core element.

As shown in FIG. 1, the system 10 further includes an imaging device 28. The imaging device 28 is disposed in a position between the outer cladding element 24 of the structure 12 and the pumping source 22. In this position, the imaging device 28 converges the energy provided by the pumping source 22 onto the inner cladding element 16. As a result of the inclusion of the imaging device 28, the inner cladding element 16 of the structure 12 can either be side-pumped or end-pumped. Side-pumping of the structure 12 of the subject invention is also ideal because the inner cladding element 16 is optically dense to the energy, or radiation, provided from the pumping source 22 thereby enabling the energy to be distributed along the length of the inner cladding element 16.

Figure 3:
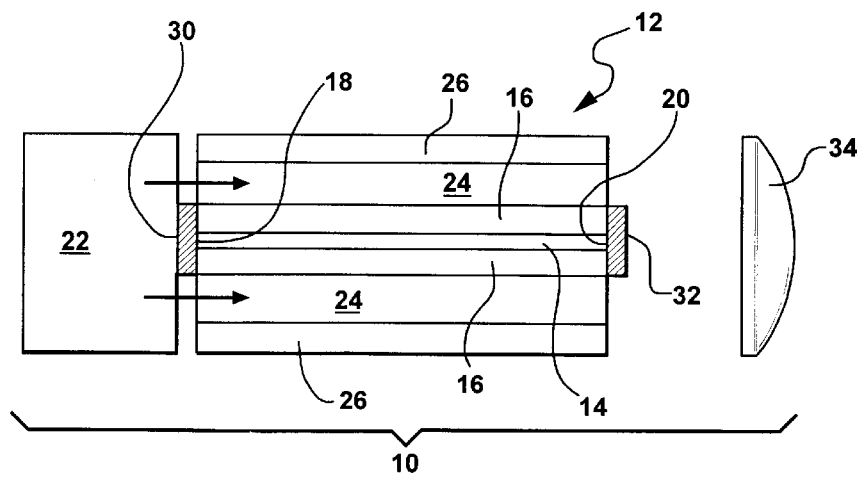
FIG. 3 is a partially cross-sectional side view of the optical fiber laser system.

Referring to FIG. 3, the system 10 further includes first 30 and second 32 reflectors. The first reflector 30 is disposed at the first end 18 of the core element 14, and the second reflector 32 is disposed at the second end 20 of the core element 14. It is to be understood that the first and second reflectors 30, 32 may include, but are not limited to, a coating, or a mirror. Preferably, the first and second reflectors 30, 32 are mirrors. In the most preferred embodiment of the subject invention, the second reflector 32 is different from the first reflector 30. More specifically, the second reflector 32 is different from the first reflector 30 in that the first reflector 30 is reflective at 1054 nm and 1535 nm and the second reflector 32 is reflective at 1054 nm and transparent at 1535 nm. Because of the transparency of the second reflector 32 at 1535 nm, the structure 12 and system 10 according to the subject invention provide the laser activity at the preferred laser wavelength. Finally, the system 10 may additionally include an output coupler 34 disposed adjacent the second reflector 32 to control an amount of the laser activity that exits the structure 12.

One example of the subject invention includes the use of 10 to 30 wt. % Nd in the inner cladding element 16, pumped by 808 nm diodes. The core element 14 is doped with Yb as the first active gain component to provide gain at the Yb wavelength. In this example, the Nd in the inner cladding element 16 is easily excited by the pumping source 22 to gain levels in excess of 20 dB causing the onset of ASE. The energy in the inner cladding element 16 is trapped in the inner cladding element 16 by the outer cladding element 24, which has a lower index of refraction $n_3$, and by a highly reflective coating applied on ends of the structure 12. The core element 14 then uniformly absorbs this energy which gives rise to generation of gain at the Yb wavelength as desired. Of course, it is to be understood that the same example may be applied to the generation of gain at the Er wavelength if Er is substituted in the core element 14 as the first active gain component.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims. Furthermore, the reference numerals are merely for convenience and are not to be in any way to be read as limiting.

What is claimed is:

1. An optical fiber laser structure comprising:
   a core element having a first and second end and comprising a first active gain component; and
   a cladding element at least partially surrounding said core element and having a length defined between said first and second ends of said core element
      a second active gain component different from said first active gain component wherein said second active gain component is suitable for achieving amplified spontaneous emission in said cladding element along said length between said first and second ends such that energy is efficiently transferred to said first active gain component in said core element to provide laser activity at a laser wavelength of from 1500 to 1600 nanometers (nm).

2. An optical fiber laser structure as set forth in claim 1 wherein said first active gain component comprises Yb such that said laser activity is provided at said laser wavelength of from 1500 to 1600 nm.

3. An optical fiber laser structure as set forth in claim 1 wherein said first active gain component comprises Er such that said laser activity is provided at said laser wavelength of from 1500 to 1600 nm.

4. An optical fiber laser structure as set forth in claim 1 wherein said first active gain component is selected from the group consisting of Yb, Er, and combinations thereof such that said laser activity is provided at said laser wavelength of from 1500 to 1600 nm.

5. An optical fiber laser structure as set forth in claim 1 wherein said first active gain component comprises a combination of Yb and Er such that said laser activity is provided at said laser wavelength of from 1500 to 1600 nm.

6. An optical fiber laser structure as set forth in claim 5 wherein the weight ratio of said Yb to said Er in said combination is from 30.0 : 1 to 0.001 : 8.0.

7. An optical fiber laser structure as set forth in claim 5 wherein said core element further comprises an additional active gain component selected from the group consisting of Ho, Pr, Dy, Sm, Eu, Tb, Ce, Cu, Cr, and combinations thereof.

8. An optical fiber laser structure as set forth in claim 5 wherein said second active gain component comprises Nd that is suitable for achieving said amplified spontaneous emission in said cladding element to efficiently transfer energy to said combination of Yb and Er in said core element.

9. An optical fiber laser structure as set forth in claim 8 wherein said cladding element further comprises an additional active gain component selected from the group consisting of Ho, Pr, Dy, Sm, Eu, Tb, Ce, Cu, Cr, and combinations thereof.

10. An optical fiber laser structure as set forth in claim 1 wherein each of said core element and said cladding element have an index of refraction with said index of refraction of said core element being greater than said index of refraction of said cladding element.

11. An optical fiber laser structure as set forth in claim 10 wherein said index of refraction of said core element is greater than said index of refraction of said cladding element by about 0.001.

12. An optical fiber laser structure as set forth in claim 10 wherein said cladding element is further defined as an inner cladding element and said structure further comprises an outer cladding element surrounding said inner cladding element.

13. An optical fiber laser structure as set forth in claim 12 wherein said outer cladding element has an index of refraction with said index of refraction of said inner cladding element being greater than said index of refraction of said outer cladding element.

14. An optical fiber laser structure as set forth in claim 12 wherein said index of refraction of said inner cladding element is greater than said index of refraction of said outer cladding element by about 0.01.

15. An optical fiber laser structure as set forth in claim 12 further comprising a protective coating surrounding said outer cladding element.

16. An optical fiber laser structure as set forth in claim 1 wherein said core element and said cladding element further comprise phosphate-based glass.

17. An optical fiber laser structure as set forth in claim 1 wherein said core element is further defined as a single-mode core element.

18. An optical fiber laser structure as set forth in claim 1 further comprising more than one core element at least partially surrounded by said cladding element.

19. An optical fiber laser structure as set forth in claim 1 wherein said cladding element completely surrounds said core element.

20. An optical fiber laser structure as set forth in claim 1 wherein said cladding element has a cross-sectional shape suitable for the efficient transfer of energy to said core element.

21. An optical fiber laser structure as set forth in claim 20 wherein said cross-sectional shape of said cladding element is further defined as a rectangular shape.

22. An optical fiber laser structure as set forth in claim 1 wherein said first active gain component is present in an amount from 0.001 to 10 parts by weight based on 100 parts by weight of said core element.

23. An optical fiber laser structure as set forth in claim 22 wherein said core element further comprises a sensitizer component.

24. An optical fiber laser structure as set forth in claim 23 wherein said sensitizer component is present in an amount from 0.001 to 30.0 parts by weight based on 100 parts by weight of said core element.

25. An optical fiber laser structure as set forth in claim 1 wherein said second active gain component is present in an amount from 0.001 to 40.0 parts by weight based on 100 parts by weight of said cladding element.

26. An optical fiber laser structure as set forth in claim 1 wherein said first active gain component is selected from the group consisting of Ho, Pr, Dy, Sm, Eu, Tb, Ce, Cu, Cr, and combinations thereof.

27. An optical fiber laser structure as set forth in claim 1 wherein said second active gain component is selected from the group consisting of Ho, Pr, Dy, Sm, Eu, Tb, Ce, Cu, Cr, and combinations thereof.

28. An optical fiber laser structure as set forth in claim 1 wherein said first active gain component is further defined as a three-level active gain component.

29. An optical fiber laser structure as set forth in claim 1 wherein said second active gain component is further defined as a four-level active gain component.

30. An optical fiber laser structure as set forth in claim 1 in combination with a pumping source coupled to said cladding element to provide energy to said cladding element such that said second active gain component achieves said amplified spontaneous emission.

31. An optical fiber laser structure comprising:
a core element having a first and second end and comprising at least one of Yb or Er as a first active gain component suitable for providing laser activity at a laser wavelength of from 1500 to 1600 nanometers (nm); and
a cladding element at least partially surrounding said core element and having a length defined between said first and second ends of said core element
a second active gain component different from said first active gain component wherein said second active gain component is suitable for achieving amplified spontaneous emission in said cladding element along said length between said first and second ends such that energy is efficiently transferred to said first active gain component in said core element.

32. An optical fiber laser structure as set forth in claim 31 wherein said second active gain component comprises Nd that is suitable for achieving said amplified spontaneous emission in said cladding element to efficiently transfer energy to said at least one of Yb or Er in said core element.

33. An optical fiber laser structure as set forth in claim 31 wherein said cladding element is further defined as an inner cladding element and said structure further comprises an outer cladding element surrounding said inner cladding element.

34. An optical fiber laser system for providing eye-safe laser activity, said system comprising:
an optical fiber laser structure comprising;
a core element having a first and second end and comprising a first active gain component; and
a cladding element at least partially surrounding said core element and having a length defined between said first and second ends of said core element
a second active gain component different from said first active gain component wherein said second active gain component is suitable for achieving amplified spontaneous emission in said cladding element along said length between said first and second ends such that energy is efficiently transferred to said first active gain component in said core element to provide the laser activity at a laser wavelength of from 1500 to 1600 nanometers (nm); and
a pumping source coupled to said cladding element to provide energy to said cladding element such that said second active gain component achieves said amplified spontaneous emission.

35. An optical fiber laser system as set forth in claim 34 wherein said first active gain component comprises at least one of Yb or Er such that said laser wavelength is from 1500 to 1600 nm.

36. An optical fiber laser system as set forth in claim 34 wherein said second active gain component comprises Nd that is suitable for achieving said amplified spontaneous emission in said cladding element to efficiently transfer energy to said first active gain component in said core element.

37. An optical fiber laser system as set forth in claim 34 wherein said cladding element is further defined as an inner cladding element and said optical fiber laser structure of said system further comprises an outer cladding element surrounding said inner cladding element.

38. An optical fiber laser system as set forth in claim 37 further comprising an imaging device disposed between said outer cladding element of said optical fiber laser structure and said pumping source for converging the energy provided by said pumping source onto said inner cladding element such that said inner cladding element can be either side-pumped or end-pumped.

39. An optical fiber laser system as set forth in claim 34 wherein said pumping source is further defined as a laser diode.

40. An optical fiber laser system as set forth in claim 34 wherein said pumping source is further defined as a flashlamp.

41. An optical fiber laser system as set forth in claim 34 wherein said pumping source is further defined as a thermal blackbody.

42. An optical fiber laser system as set forth in claim 34 wherein said pumping source is further defined as nuclear radiation.

43. An optical fiber laser system as set forth in claim 34 further comprising a first reflector disposed at said first end of said core element and a second reflector disposed at said second end of said core element.

44. An optical fiber laser system as set forth in claim 43 wherein said second reflector is different from said first reflector in that said first reflector is reflective at 1054 nm and 1535 nm and said second reflector is reflective at 1054 nm and transparent at 1535 nm.

* * * * *